US012617070B2

(12) United States Patent
Wei

(10) Patent No.: US 12,617,070 B2
(45) Date of Patent: May 5, 2026

(54) KEY HOLDER

(71) Applicant: STANLEY BLACK & DECKER MEA FZE, Jebel Ali (AE)

(72) Inventor: Kaixuan Wei, Taichung City (TW)

(73) Assignee: STANLEY BLACK & DECKER MEA FZE, Jebel Ali (AE)

(*) Notice: Subject to any disclaimer, the term of this patent is extended or adjusted under 35 U.S.C. 154(b) by 0 days.

(21) Appl. No.: 18/334,921

(22) Filed: Jun. 14, 2023

(65) Prior Publication Data

US 2023/0405797 A1 Dec. 21, 2023

(30) Foreign Application Priority Data

Jun. 17, 2022 (EP) .................................... 22179535

(51) Int. Cl.
*B25H 3/00* (2006.01)

(52) U.S. Cl.
CPC .................................... *B25H 3/003* (2013.01)

(58) Field of Classification Search
CPC ..... B65D 25/102; B25B 15/008; B25B 13/56; B25B 21/00; B25B 23/0007; B25B 3/003; B25B 15/0004; B25B 15/007; B25B 21/12; B25B 11/002; B25B 21/007; B25H 3/003; B25H 3/00; B25H 3/04; B25H 3/022; B25H 5/00; B25H 15/008; B25G 1/085
USPC ............... 206/377, 372, 443, 379, 350, 818; 81/177.4, 490; 211/70.6, 163, 60.1, 70
See application file for complete search history.

(56) References Cited

U.S. PATENT DOCUMENTS

| | | | | | |
|---|---|---|---|---|---|
| 2,590,307 | A | * | 3/1952 | Gibson ................... | B25B 13/56 206/377 |
| RE23,659 | E | * | 5/1953 | Steine ..................... | B25B 13/56 211/69 |
| 2,810,472 | A | * | 10/1957 | Midkiff ................... | B25B 13/56 206/377 |
| 3,997,053 | A | * | 12/1976 | Bondhus ................ | B25B 13/56 D8/71 |

(Continued)

FOREIGN PATENT DOCUMENTS

| | | |
|---|---|---|
| CN | 205703917 U | 11/2016 |
| CN | 215037017 U | 12/2021 |

(Continued)

OTHER PUBLICATIONS

Extended European Search Report, EP Application No. 22179535.4, Dec. 5, 2022, 7 pages, EPO.

*Primary Examiner* — Steven A. Reynolds
*Assistant Examiner* — Prince Pal
(74) *Attorney, Agent, or Firm* — Jordan IP Law, LLC; Todd A. Vaughn

(57) ABSTRACT

The present invention relates to a key holder for a set of graduated keys such as hexagonal (hex) or Allen keys. The key holder includes two or more segments each having at least one opening for receiving a key. The holder further includes a hinge that is configured to permit the movement of adjacent segments between and aligned position and an unaligned position. In the aligned position, the removal of the smaller of two graduated keys is blocked when said keys are in the openings of adjacent segments and are positioned in the same direction. In the unaligned position, graduated keys in adjacent segments are perpendicular to one another and the smaller key can be removed without interference from the larger key.

18 Claims, 3 Drawing Sheets

(56) References Cited

U.S. PATENT DOCUMENTS

| | | | | | |
|---|---|---|---|---|---|
| 5,320,004 | A * | 6/1994 | Hsiao | B25G 1/085 | 81/177.4 |
| 5,566,596 | A * | 10/1996 | Lin | B25G 1/105 | 81/177.4 |
| 5,816,401 | A * | 10/1998 | Vasudeva | B25H 3/003 | 211/70.6 |
| 6,032,796 | A * | 3/2000 | Hopper | B25H 3/003 | 206/472 |
| 6,053,316 | A * | 4/2000 | Lo | B25H 3/003 | 206/379 |
| D435,415 | S * | 12/2000 | Johnson | D8/71 | |
| D461,311 | S * | 8/2002 | Gharib | D3/315 | |
| 7,331,455 | B2 * | 2/2008 | Lin | B25H 3/003 | 206/378 |
| 7,481,137 | B1 * | 1/2009 | Johnson | B25B 15/008 | 81/177.4 |
| 8,276,767 | B2 * | 10/2012 | Su | B25H 3/003 | 211/70.6 |
| 8,490,523 | B2 * | 7/2013 | Tsai | B25F 1/04 | 81/439 |
| 8,708,143 | B2 * | 4/2014 | Liu | B25H 3/003 | 206/372 |
| 8,950,597 | B2 * | 2/2015 | Lin | B25H 3/003 | 211/70.6 |
| D731,795 | S * | 6/2015 | Lai | D3/315 | |
| 9,156,155 | B2 * | 10/2015 | Poillot | B25H 3/00 | |
| 9,193,062 | B2 * | 11/2015 | Johnson | B25H 3/003 | |
| 9,227,315 | B2 * | 1/2016 | Hermansen | B25B 27/0071 | |
| 9,545,706 | B2 * | 1/2017 | Ou | B25B 13/56 | |
| D784,104 | S * | 4/2017 | Lai | D8/71 | |
| 10,723,014 | B2 * | 7/2020 | Gallegos | B25H 3/003 | |
| 11,780,074 | B2 * | 10/2023 | Wong | B25H 3/003 | 206/377 |
| 2003/0136234 | A1 * | 7/2003 | Cunningham | B25B 15/008 | 81/177.4 |
| 2005/0183552 | A1 * | 8/2005 | Hawkins | B25B 15/008 | 81/440 |
| 2006/0101955 | A1 * | 5/2006 | Chang | B25B 15/008 | 81/439 |
| 2007/0186731 | A1 * | 8/2007 | Schnarr | B25H 3/003 | 81/177.4 |
| 2008/0202963 | A1 * | 8/2008 | Liao | B25H 3/003 | 206/377 |
| 2011/0000024 | A1 * | 1/2011 | Johnson | B25F 1/02 | 7/138 |
| 2013/0112635 | A1 * | 5/2013 | Tsukaguchi | B25H 3/04 | 211/70.6 |
| 2013/0228484 | A1 * | 9/2013 | Yang | B25H 3/003 | 206/349 |
| 2013/0228539 | A1 * | 9/2013 | Lin | B25H 3/003 | 211/70.6 |
| 2013/0256168 | A1 * | 10/2013 | Poillot | B25B 15/008 | 206/372 |
| 2013/0306508 | A1 * | 11/2013 | Gallegos | B25H 3/003 | 53/474 |
| 2014/0091118 | A1 * | 4/2014 | Hsiao | A45F 5/00 | 224/242 |
| 2014/0151253 | A1 * | 6/2014 | Lai | B25H 3/003 | 206/377 |
| 2015/0001113 | A1 * | 1/2015 | Hsiao | B25H 3/04 | 206/377 |
| 2015/0151413 | A1 * | 6/2015 | Ou | B25H 3/003 | 206/377 |
| 2015/0158154 | A1 * | 6/2015 | Chen | B25F 1/00 | 206/377 |
| 2016/0136791 | A1 * | 5/2016 | Ou | B25H 3/003 | 206/377 |
| 2018/0281170 | A1 * | 10/2018 | Tsai | B25H 3/003 | |
| 2020/0171642 | A1 * | 6/2020 | Newman | B25B 13/5058 | |
| 2023/0405797 | A1 * | 12/2023 | Wei | B25H 3/003 | |
| 2025/0058454 | A1 * | 2/2025 | Tsai | B25H 3/003 | |

FOREIGN PATENT DOCUMENTS

| | | | | |
|---|---|---|---|---|
| DE | 102005056535 | A1 * | 5/2007 | B25H 3/003 |
| DE | 202011103389 | U1 | 12/2011 | |
| EP | 1954452 | B1 | 9/2016 | |
| WO | WO-2007060065 | A1 * | 5/2007 | B25H 3/003 |

* cited by examiner

KEY HOLDER

CROSS-REFERENCE TO RELATED APPLICATIONS

This application claims priority to EP Patent Application No. 22179535.4, filed on Jun. 17, 2022, which is incorporated herein by reference in its entirety.

FIELD OF THE INVENTION

The present invention relates to a key holder. More specifically, the invention relates to a key holder that permits the orderly and easy removal of said keys.

BACKGROUND OF THE INVENTION

Keys, such as hexagonal (hex) or Allen type keys are well-known tools that are useful for a variety of different torquing jobs. These keys (or wrenches) are typically purchased in a graduated set within a holder, wherein each key is slightly larger (or smaller) than the one immediately next to it. Moreover, the keys are typically bent such that one portion of the key is in a different plane from a second portion. Keys within a holder are often positioned facing the same direction such that the bent portion of the larger key is cantilevered over the bent portion of its immediate neighbor. This arrangement often makes for an orderly and compact presentation of the set of keys.

While it is advantageous to have a full set of keys to permit an operator to tackle a variety of jobs, the cantilevered nature of their positioning within a holder often causes frustration when it comes time to use a key. The larger keys can block or limit the removal of smaller keys from the holder. If an operator needs to use any key other than the largest one, she often needs to remove several other keys before she can remove the desired key. This is an unnecessary waste of time. It would be advantageous to have a key holder that provides a compact orderly presentation of the graduated keys and simultaneously permits the removal of a desired key without the need to remove any other keys.

SUMMARY OF THE INVENTION

According to an aspect of the invention, a holder for a plurality of graduated keys, said holder having two or more segments each defining at least one opening therethrough. Each of said openings is configured to receive one of a series of graduated keys and selectively secure said key therein. The holder is characterized in that it further includes a hinge connecting adjacent segments. The hinge is configured to permit movement of the adjacent segments between an aligned position and an unaligned position. In the aligned position, the removal of the smaller of two graduated keys is blocked when said keys are in the openings of adjacent segments and are positioned in the same direction. In the unaligned position, graduated keys in adjacent segments are perpendicular to one another and the smaller key can be removed without interference from the larger key.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, steps, operations, elements, and/or components, but do not preclude the presence or addition of at least one other feature, step, operation, element, component, and/or groups thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

For definitional purposes and as used herein, "connected" or "attached" includes physical or electrical, whether direct or indirect, affixed or adjustably mounted. Thus, unless specified, "connected" or "attached" is intended to embrace any operationally functional connection. When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As used herein, "substantially," "generally," "slightly" and other words of degree are relative modifiers intended to indicate permissible variation from the characteristic so modified. It is not intended to be limited to the absolute value or characteristic which it modifies but rather possessing more of the physical or functional characteristic than its opposite, and approaching or approximating such a physical or functional characteristic.

In the following description, reference is made to the accompanying attachments and drawings which are provided for descriptive and illustration purposes as representative of specific exemplary embodiments in which the invention may be practiced. Given the following description of the specification and drawings, the apparatus, methods, and systems should become evident to a person of ordinary skill in the art. Further areas of applicability of the present teachings will become apparent from the description and illustrations provided herein. It is to be understood that other embodiments can be utilized and that structural changes based on presently known structural and/or functional equivalents can be made without departing from the scope of the invention.

BRIEF DESCRIPTION OF THE DRAWINGS

The above-mentioned and other features, embodiments, and advantages of this invention, and the manner of attaining them, will become more apparent and the invention will be better understood by reference to the following descriptions of embodiments of the invention taken in conjunction with the accompanying drawings, wherein.

Corresponding illustrated images and attachments indicate corresponding parts throughout the several views of the present invention. The exemplifications set out herein illustrate embodiments of the present invention, and such exemplifications are not to be construed as limiting the scope of the present invention in any manner.

These and other features of the invention will become apparent upon review of the following description of the presently preferred embodiments of the invention, taken into conjunction with the figures.

DETAILED DESCRIPTION OF THE ILLUSTRATED EMBODIMENT(S)

A detailed description of apparatuses, methods, and systems, consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Figure 1B:
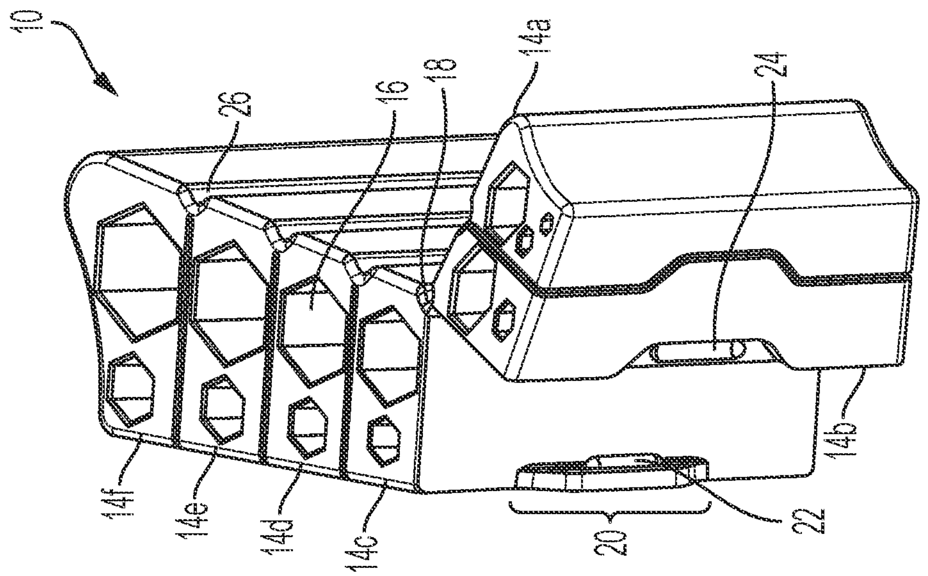
FIG. 1*b* illustrates an alternate perspective view of the key holder in its unaligned position.
Figure 1A:
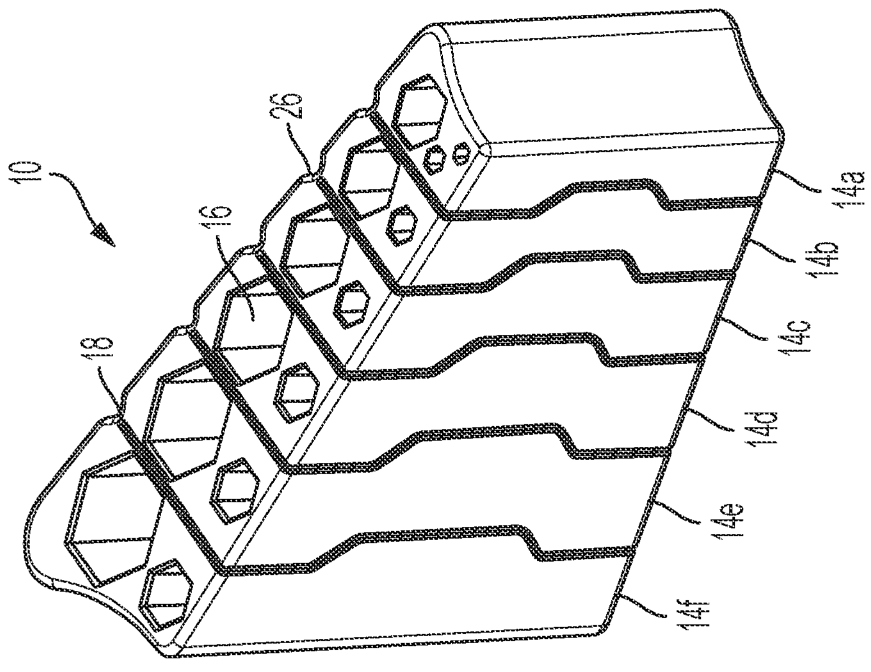
FIG. 1*a* illustrates perspective view of the key holder in its aligned position.

FIGS. 1*a* and 1*b* depict alternate perspective view of a key holder 10 according to the present invention. The holder includes two or more segments 14*a-f* each defining at least one opening 16 therethrough. Each of said openings 16 is configured to receive one of a series of graduated keys. As shown in the figures, said openings may be hexagonally shaped and configured to receive a hexagonal (hex) or Allen type key. However, those skilled in the art will recognize that the openings may be of any shape and configured to receive a corresponding tool of the same shape.

Figure 2B:
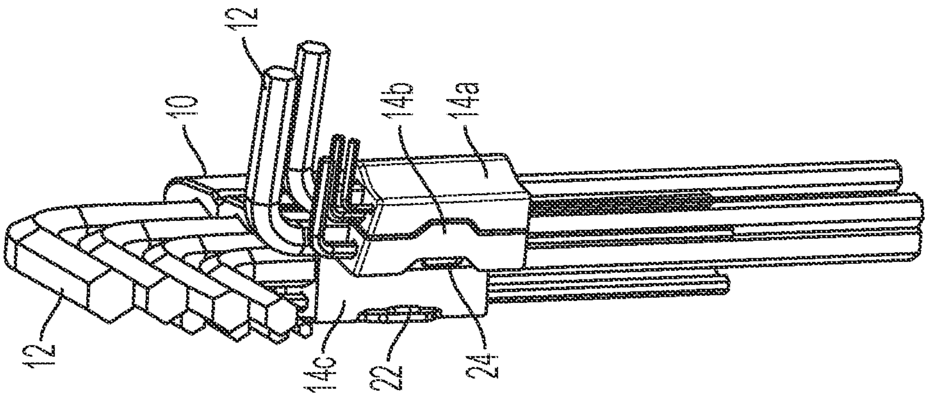
FIG. 2*b* illustrates an alternate perspective view of the key holder with a full set of graduated keys, and wherein the key holder is in its unaligned position.
Figure 2A:
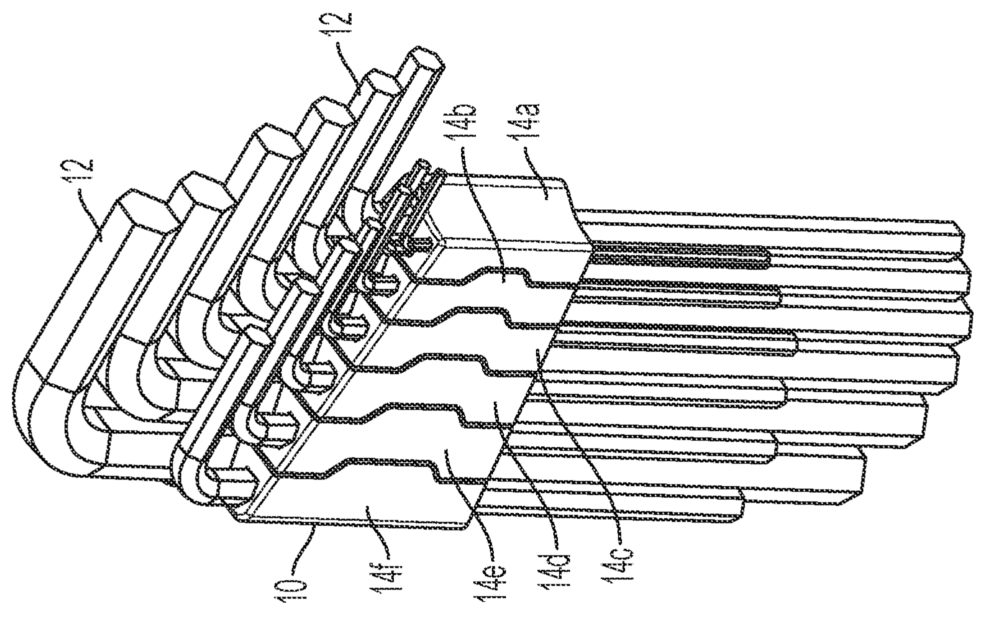
FIG. 2*a* illustrates a perspective view of the key holder with a full set of graduated keys, and wherein the key holder is in its aligned position.

The holder 10 also includes a hinge 18 that connects adjacent segments 14*a-f*. The hinge 18 is configured to permit movement of the adjacent segments between an aligned position (see FIG. 1*a*) and an unaligned position (see FIG. 1*b*). In the aligned position, the removal of the smaller of two graduated keys 12 is blocked when said keys are in the openings of adjacent segments and are positioned in the same direction. In other words, the bent portion of the larger key is cantilevered over the bent portion of the smaller key in the adjacent segment. See FIG. 2*a*. In the unaligned position, the bent portions of graduated keys in adjacent segments are perpendicular to one another and the smaller key can be removed without interference from the larger key. See FIG. 2*b*.

Those skilled in the art will recognize that a wide variety of connecting hinges 18 may be employed. For example, as depicted in FIG. 1*b*, the hinge 18 may be integrated directly into the segments. In other words, the segments 14*a-f* of holder 10 may be formed from a single piece of material, and the hinge 18 may be a thin connecting portion. In a preferred embodiment, the edges 26 of the segments 14*a-f* adjacent the hinge 18 may be beveled. See FIG. 1*b*. Such beveling functions to prevent overbending the segments, which, over time, could weaken the hinge 18.

Figure 3C:
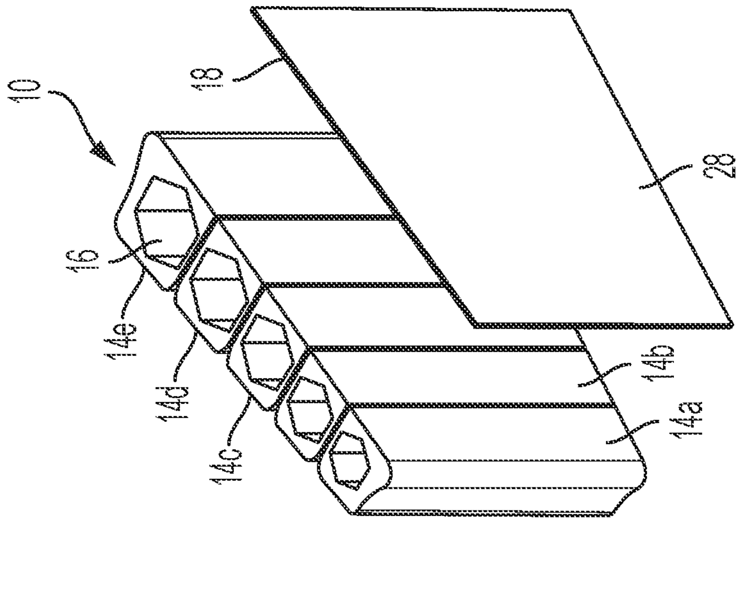
FIG. 3*c* illustrates a perspective view of a fourth embodiment of the key holder in its aligned position.
Figure 3B:
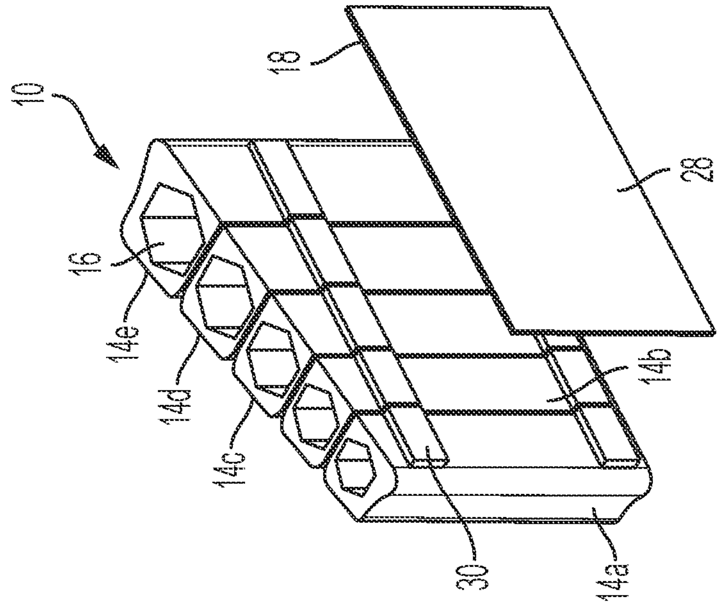
FIG. 3*b* illustrates a perspective view of a third embodiment of the key holder in its aligned position.
Figure 3A:
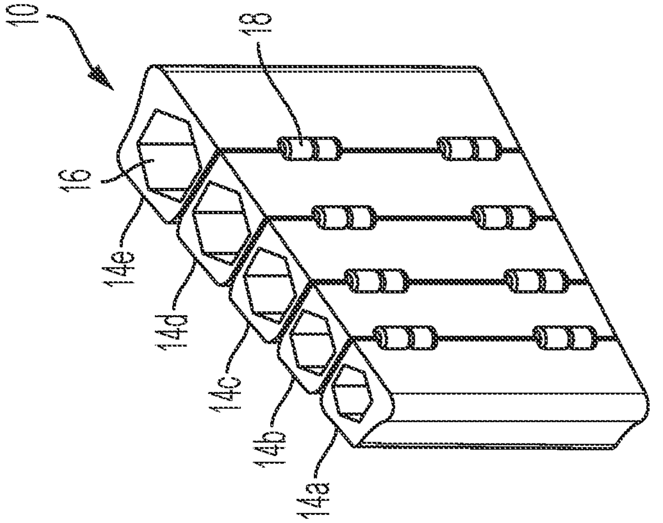
FIG. 3*a* illustrates a perspective view of a second embodiment of the key holder in its aligned position.

In an alternate embodiment, the hinge 18 could also be a bearing hinge. See FIG. 3*a*. In yet further alternative embodiments, the hinge 18 could be formed from a single piece of flexible material 28 adhered to the segments. Said adherence can be achieved in a variety of ways. For example, as shown in FIG. 3*b*, the flexible material 28 can be disposed in holding slots 30 on the segments 14*a-f*. Alternatively, as shown in FIG. 3*c*, the flexible material 28 may include a side having an adhesive, which is used to adhere the thin flexible material 28 directly to the segments.

In a preferred embodiment, the holder 10 may further comprises a two-piece locking mechanism 20 positioned on adjacent segments 14*a-f* and distal to the hinge 18. The two-piece locking mechanism 20 is configured to selectively bind adjacent segments in their aligned position. The first piece 22 of the locking mechanism 20 is positioned on a first segment, and the second piece 24 is positioned on the adjacent segment. Preferably, the first piece 22 of locking mechanism 20 is a protrusion, and the second piece 24 is a depression configured to receive the protrusion. Although the two piece locking mechanism 20 is depicted as a protrusion/depression mechanism, those skilled in the art will recognize that any number two piece locking mechanisms, such as a latch or clasp, can be employed so long as the first piece 22 is on one segment 14*c* and the second piece 24 is on the adjacent segment 14*b*.

The example and alternative embodiments described above may be combined in a variety of ways with each other. It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. Furthermore, the steps and number of the various steps illustrated in the figures may be adjusted from that shown. The accompanying figures and attachments illustrate exemplary embodiments of the invention.

Although the present invention has been described in terms of particular example and alternative embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the example and alternative embodiments described above can be configured without departing from the scope and spirit of the invention. Therefore, it is to be understood that, within the scope of the appended claims, the invention may be practiced other than as specifically described herein.

What is claimed is:

1. A key holder for a plurality of graduated keys, said key holder comprising:

two or more segments each defining at least one opening therethrough, wherein each opening of said at least one opening is configured to receive a corresponding key in a series of graduated keys and selectively secure said key therein;

a hinge connecting adjacent segments in the two or more segments, wherein said hinge is configured to permit movement of the adjacent segments between an aligned position and an unaligned position, wherein in said aligned position, a bent portion of a larger key is cantilevered over a bent portion of a smaller key in an adjacent segment to block and prevent removal of the smaller key when said keys are received in the openings of adjacent segments and are positioned in a same direction, and wherein in said unaligned position, the bent portions of the graduated keys in adjacent segments are perpendicular to one another to enable removal of the smaller key without interference from the larger key; and a two-piece locking mechanism positioned on adjacent segments and distal to the hinge, and wherein a first piece of the locking mechanism is positioned on one segment and a mating second piece of the locking mechanism is positioned on an adjacent second segment, and wherein the two piece locking mechanism is configured to selectively bind the segments in their aligned position.

2. The key holder of claim 1, wherein the first piece of the locking mechanism is a protrusion, and the second piece of the locking mechanism is a depression configured to receive the protrusion.

3. The key holder of claim 1, wherein edges of the segments adjacent the hinge are beveled.

4. The key holder of claim 1, wherein said hinge is a bearing hinge.

5. The key holder of claim 1, wherein the hinge is a thin piece of flexible material held to the segments with an adhesive material.

6. The key holder of claim 1, wherein the segments further include one or more holding slots configured to receive hold a thin piece of flexible material, which when disposed in the holding slots, functions as the hinge.

7. The key holder of claim 3, wherein the segments further include one or more holding slots configured to receive hold a thin piece of flexible material, which when disposed in the holding slots, functions as the hinge.

8. The key holder of claim 1, wherein the at least one opening is hexagonally shaped and configured to receive a hexagonal key.

9. The key holder of claim 2, wherein the at least one opening is hexagonally shaped and configured to receive a hexagonal key.

10. A key holder for a plurality of graduated keys, said holder comprising:

three or more segments each defining at least one segment opening, the at least one segment opening including a segment longitudinal axis passing longitudinally therethrough, wherein each of said segment openings is configured to receive one of a series of graduated keys and selectively secure said key therein;

at least two hinges each pivotably connecting respective adjacent segments in the three or more segments, which segments each include respective longitudinal axes, said at least two hinges each having a hinge pivot axis, wherein said at least two hinges are configured to permit pivotal movement of the respective adjacent segments between an aligned position and an unaligned position, wherein each hinge pivot axis is generally parallel to each respective longitudinal axes of each respective adjacent segment in said aligned position and in said unaligned position; and a locking mechanism including a first piece positioned on a first segment and a second piece positioned on an adjacent second segment to mate with the first piece and selectively bind the first segment and the second segment in the aligned position.

11. The key holder of claim 10, wherein the hinge is a thin piece of flexible material held to the segments with an adhesive material.

12. The key holder of claim 10, wherein the at least one opening is hexagonally shaped and configured to receive a hexagonal key.

13. The key holder of claim 10, wherein each segment includes an outer wall surface that complementarily engages an outer wall surface of an adjacent segment in the aligned position.

14. The key holder of claim 10, wherein in said aligned position, a bent portion of a larger key is cantilevered over a bent portion of a smaller key in an adjacent segment to block and prevent removal of the smaller key when said keys are received in the openings and are positioned in a same direction.

15. The key holder of claim 10, wherein in said unaligned position, bent portions of the graduated keys in adjacent segments are perpendicular to one another to enable removal of the smaller key without interference from a larger key.

16. The key holder of claim 10, wherein the locking mechanism is positioned between the adjacent segments and distal to the hinge.

17. The key holder of claim 10, wherein:

the first piece is a protrusion, and the second piece is a depression configured to receive the protrusion for the mating between the first piece and the second piece.

18. A key holder for a plurality of graduated keys, the key holder comprising:

a first segment defining at least one opening therethrough configured to receive and selectively secure a corresponding first key among the plurality of graduated keys;

a second segment, adjacent to the first segment, defining at least one opening therethrough configured to receive and selectively secure a corresponding second key among the plurality of graduated keys, wherein the second key is larger in size than the first key;

a hinge integrated directly into the first segment and the second segment to permit movement of the first segment and the second segment between an aligned position and an unaligned position, wherein in said aligned position, a bent portion of the second key is cantilevered over a bent portion of the first key to block and prevent removal of the first key when the first key and the second key are received in the openings and are positioned in a same direction, and wherein in said unaligned position, the bent portions of the first key and the second key are perpendicular to one another to enable removal of the first key without interference from the second key; and a locking mechanism including a first piece positioned on the first segment and a second piece positioned on the second segment to mate with the first piece and selectively bind the adjacent segments in the aligned position.

* * * * *